(No Model.)

C. E. SWICK & J. M. REID.
RATCHET WRENCH.

No. 587,464.                    Patented Aug. 3, 1897.

Witnesses:
W. J. Lewellen
Wm Tuck

Inventors:
Clarence Eugene Swick
John Marion Reid

UNITED STATES PATENT OFFICE.

CLARENCE EUGENE SWICK AND JOHN MARION REID, OF SPRINGWATER, OREGON.

RATCHET-WRENCH.

SPECIFICATION forming part of Letters Patent No. 587,464, dated August 3, 1897.

Application filed April 15, 1896. Serial No. 588,412. (No model.)

*To all whom it may concern:*

Be it known that we, CLARENCE EUGENE SWICK and JOHN MARION REID, citizens of the United States, residing at Springwater, in the county of Clackamas, State of Oregon, have invented a new and useful Ratchet-Wrench, of which the following is a description.

Our invention relates to a device which is adapted to be used to turn nuts in either direction; and it consists in certain details of construction, which will be more fully explained by reference to the accompanying drawings, in which—

Figure 1:
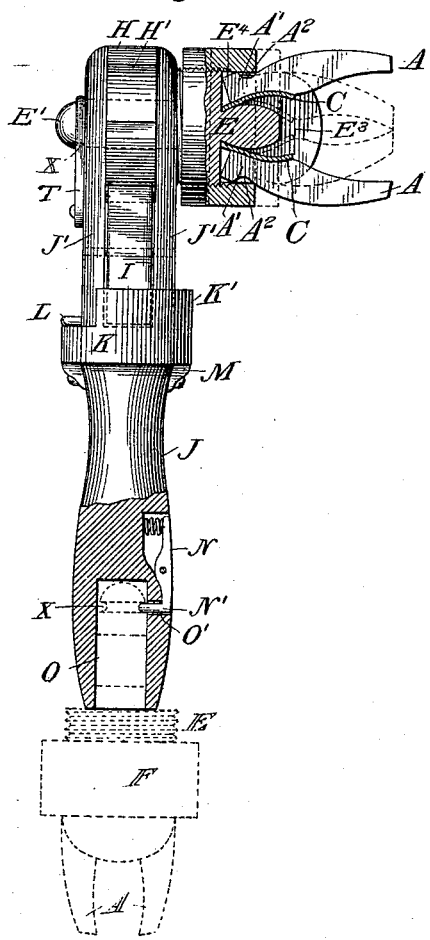
Figure 2:
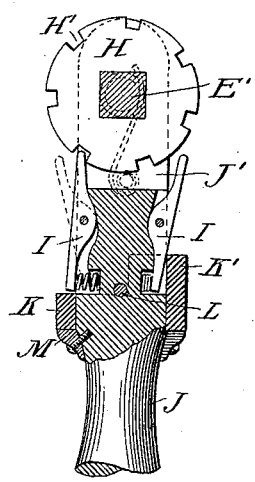

Figure 1 is a side elevation of our invention, certain parts being shown in section to more clearly show the interior structure; and Fig. 2 is a longitudinal section of the head of the wrench, portions being shown in elevation.

Referring to the drawings, J represents the handle, having its forward end bifurcated, forming arms J' J', and its rear end provided with a central longitudinal opening O, having an angular cross-section.

E is the jaw-carrying head, provided with a reduced extension E'. This extension extends laterally from the central portion of the outer face of the cylindrical head E. The extension E' is located in circular alined openings through the arms J' J', forming the bifurcation on the front end of the handle. The portions of the extension E' are cylindrical where it passes through the openings in the arms J' J', but is polygonal in cross-section between the arms to receive the ratchet-wheel H, which lies between said arms and has an opening corresponding to the polygonal portion of the extension E'. Extension E' extends beyond the top arm J' and is provided just above the arm with a circumferential groove X to receive the correspondingly-curved end of the spring H, secured upon the upper face of the top arm J' and pressing into said groove to hold the jaw-head E in place.

The head E, opposite the extension E', has a slot $E^3$, extending inwardly in the line of its axis and from side to side. At diametrically opposite sides of the head E the slot $E^3$ has near the surface thereof inward extensions $E^4$ $E^4$, having the side walls of each extension curved, as shown in Fig. 1, the upper and lower portions being similarly shaped and curved inwardly from its longitudinal center toward the axis of the head E. Seated within the extensions or recesses $E^4$ are the upper ends of the jaws A A. The upper portions A' of the jaws have their inner faces curved correspondingly to the side walls of recess $E^4$, allowing the jaws to rock on the curved wall of said recesses. The upper ends of the jaws are cut away on their outer surfaces at $A^2$ $A^2$ for a purpose presently to be explained. Secured to the upper end of the walls $E^4$ $E^4$ are springs C C, which fit the inner faces of the upper ends of the jaws and tend to open the jaws, as shown in full lines in Fig. 1.

The head E is screw-threaded externally, and the collar F screws upon the head E and engages the outer faces of the jaws to hold them in the recesses $E^4$ and to adjust the jaws. The outer lower ends of the jaws curve outwardly, so that as the collar is secured outwardly it will force the jaws toward the position shown in dotted lines in Fig. 1. The cut-out portions of the jaws allow the jaw to open wide and leaves a head on the jaws, on which the upper ends of the jaws rock. It will be observed that the jaws fit loosely in the recesses $E^4$, but are not permitted to drop out by reason of curves on the inner faces of the jaws and on the outer walls of the recesses.

The wheel H is provided with notches H' around its periphery to be engaged by the pawls I I, pivoted in recesses in the edges of the head. These pawls have their outer ends normally tending toward the ratchet-wheel by reason of springs seated between the inner ends of the pawls and the inner walls of the recesses in which the pawls are seated. Swiveled on the head is a collar K, provided with an extension K', extending about half-way around the collar. This extension is adapted to pass over the tails of one or the other of the pawls and so hold one of them out of engagement with the ratchet-wheel.

M M are plates fastened to the handle by screws and placed just inwardly of the collar K to hold the same from outward movement, and L is a pin placed in the head just outwardly of the collar K to prevent the same from outward movement and limits the oscillation of the same by engagement with the shoulders formed by the extensions K'. As shown in Fig. 2, the ratchet-wheel would by oscillating the handle J turn the wheel to the right, but when the extension K' is over the left-hand pawl the right-hand pawl will be free to engage the ratchet-wheel and the left-hand-pawl disengaged therefrom, the wheel then being turned to the left by the oscillation of the handle.

Within a recess in the side of the handle is pivoted a pawl N, having a right-angled extension N', passing through a hole O', leading into the opening O. The outer end of the pawl is pressed outwardly to keep the extension N' normally within the opening O.

By pressing back the spring T the head E with the collar F and the jaws may be removed from the position shown in full lines in Fig. 1 and placed as shown in dotted lines in Fig. 1, the extension E' entering the opening O and the extension N' of the pawl N entering the groove X to hold the head in place.

Thus it will be seen that we have provided a tool which may be used as a ratchet-wrench with the jaws at right angles to the handle, or may be changed quickly and easily to a wrench having its jaws in line with its fixed handle.

We do not limit ourselves to the use of the wrench-head with either end of the handle, but claim it as operatively placed in either end.

What we claim is—

1. In a ratchet-wrench, a head having recesses with curved walls, a jaw seated in each recess and having opposite curved surfaces rocking on said walls, springs tending to open said jaws, a collar adjustably mounted on said head, holding the base of the jaws in engagement with said head, and adapted to urge the jaws together, substantially as set forth.

2. In a ratchet-wrench, a head having recesses with curved walls, a jaw seated in each recess and having opposite curved surfaces rocking on said walls, springs tending to open said jaws, a collar adjustably mounted on said head, holding the base of the jaws in engagement with said head, and adapted to urge the jaws together, and means for operating said wrench-head to turn the nut, substantially as set forth.

CLARENCE EUGENE SWICK.
JOHN MARION REID.

Witnesses:
LOUIS TUCKER,
W. J. LEWELLEN.